(12) United States Patent
Patil

(10) Patent No.: US 10,389,840 B2
(45) Date of Patent: Aug. 20, 2019

(54) PREFETCHING OF STREAM SEGMENTS WITH VARIABLE NAMES

(71) Applicant: Verizon Digital Media Services Inc., Dulles, VA (US)

(72) Inventor: Ravikiran Patil, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 250 days.

(21) Appl. No.: 15/392,268

(22) Filed: Dec. 28, 2016

(65) Prior Publication Data

US 2018/0183890 A1    Jun. 28, 2018

(51) Int. Cl.
| | |
|---|---|
| G06F 15/16 | (2006.01) |
| H04L 29/08 | (2006.01) |
| H04L 29/06 | (2006.01) |
| H04N 21/433 | (2011.01) |
| H04N 21/845 | (2011.01) |
| H04N 21/8543 | (2011.01) |
| H04N 21/858 | (2011.01) |

(52) U.S. Cl.
CPC ........ *H04L 67/2847* (2013.01); *H04L 65/601* (2013.01); *H04L 65/602* (2013.01); *H04N 21/4331* (2013.01); *H04N 21/8456* (2013.01); *H04N 21/858* (2013.01); *H04N 21/8543* (2013.01)

(58) Field of Classification Search
CPC .................................................. H04L 67/2847
See application file for complete search history.

(56) References Cited

U.S. PATENT DOCUMENTS

| | | | |
|---|---|---|---|
| 7,389,330 B2* | 6/2008 | Dillon | H04L 65/105 709/219 |
| 9,906,590 B2* | 2/2018 | DiVincenzo | H04L 67/1014 |
| 2014/0373032 A1* | 12/2014 | Merry | G06F 9/54 719/328 |
| 2015/0319214 A1* | 11/2015 | Yu | H04L 65/4069 709/219 |
| 2017/0054800 A1* | 2/2017 | DiVincenzo | H04L 67/1014 |
| 2018/0109643 A1* | 4/2018 | Patil | H04L 67/2847 |

* cited by examiner

*Primary Examiner* — Kevin T Bates
*Assistant Examiner* — Clarence D McCray
(74) *Attorney, Agent, or Firm* — Ansari Katiraei LLP; Arman Katiraei; Sadiq Ansari

(57) ABSTRACT

Disclosed is a dynamically adaptable stream segment prefetcher for prefetching stream segments from different media streams with different segment name formats and with different positioning of the segment name iterator within the differing segment name formats. In response to receiving a client issued request for a particular segment of a particular media stream, the prefetcher identifies the segment name format and iterator location using a regular expression matching to the client issued request. The prefetcher then generates prefetch requests based on the segment name format and incrementing a current value for the iterator in the segment name of the client issued request.

20 Claims, 4 Drawing Sheets

PREFETCHING OF STREAM SEGMENTS WITH VARIABLE NAMES

BACKGROUND ART

Media streams delivered over a digital network, such as the Internet, are typically encoded and delivered as several segments. For instance, a Moving Picture Experts Group (MPEG) media stream is formed from several transport stream (TS) files with each TS file representing a different segment of the media stream. Each segment encodes a short duration of the overall media stream.

A client player sequentially requests the segments of a particular media stream from a server in order to locally render and playback that particular media stream. Instead of requesting all segments at one time, the client player requests a next segment based on its current playback position of the particular media stream. The client player typically requests some subset of next segments ahead of the current playback position to allow the server time to respond.

If the server is too slow to respond to the client requests, the client will experience buffering or an interruption in the stream playback. One manner with which to improve server response time is for the server to prefetch into memory (i.e., volatile random access memory or caching buffer) the expected next segments that will be requested by a client player in advance of the client player requesting those segments. Prefetching allows the server to immediately respond to the client player requests upon arrival without retrieving the segments from a different origin server or slower disk storage. In other words, the server is able to respond to a request for each prefetched segment without the delay associated with a round trip time to a different server or without the delay associated with a read operation to slower storage. The server typically does not prefetch all segments of a media stream because of the large size of the media stream and limited size of the memory, and also because doing so may be a wasted operation should the client player request a certain subsection of a particular media stream before terminating playback of the particular media stream or jumping to another media stream.

The server performs an internal request and response procedure in order to prefetch media stream segments. The internal procedure involves the server generating prefetch requests that specify the names of the segments to prefetch and sending the prefetch requests to an origin server or to an internal process. The ability of the server to prefetch segments is therefore dependent on the server's ability to accurately determine the names of the segments to be prefetched from a client request for a preceding segment.

In a simple scenario, segment names of a media stream follow a sequential naming convention. Thus, if the server receives a client request for segment "streamname_segment23.ts", the server could generate prefetch requests for segments "streamname_segment24.ts", "streamname_segment25.ts", and "streamname_segment26.ts" as one example.

However, not all encoders encode media streams according to the same naming convention and media stream creators may specify their own custom naming convention for different streams. In other words, the segment name format and the iterator for the variable portion of the segment names may be different for different media streams.

Any server that is tasked with distributing multiple media streams therefore cannot use the same set of rules to generate the names for the segments to be prefetched. This is especially true in a content delivery network (CDN) where a distributed set of servers distribute several streams on behalf of many different media stream creators. The CDN is expected to not only deliver the streams without restriction to any naming convention, but to optimize the delivery through prefetching to improve the end user experience.

Accordingly, there is a need for a dynamically adaptable stream segment prefetcher. Specifically, there is a need for a prefetcher that dynamically adapts based on the variance in the naming convention of the media streams being prefetched. To that end, there is a need for the prefetcher to correctly generate prefetch requests based on different naming conventions used to specify segment names of different media streams. In other words, there is need to implement prefetching for streams where the segment name format differs and the iterator for the variable portion of the segment name is arbitrarily placed within the segment name format.

BRIEF DESCRIPTION OF THE DRAWINGS

A preferred embodiment for prefetching stream segments with variable names will now be described, by way of example only, with reference to the accompanying drawings in which.

DETAILED DESCRIPTION

Figure 1:
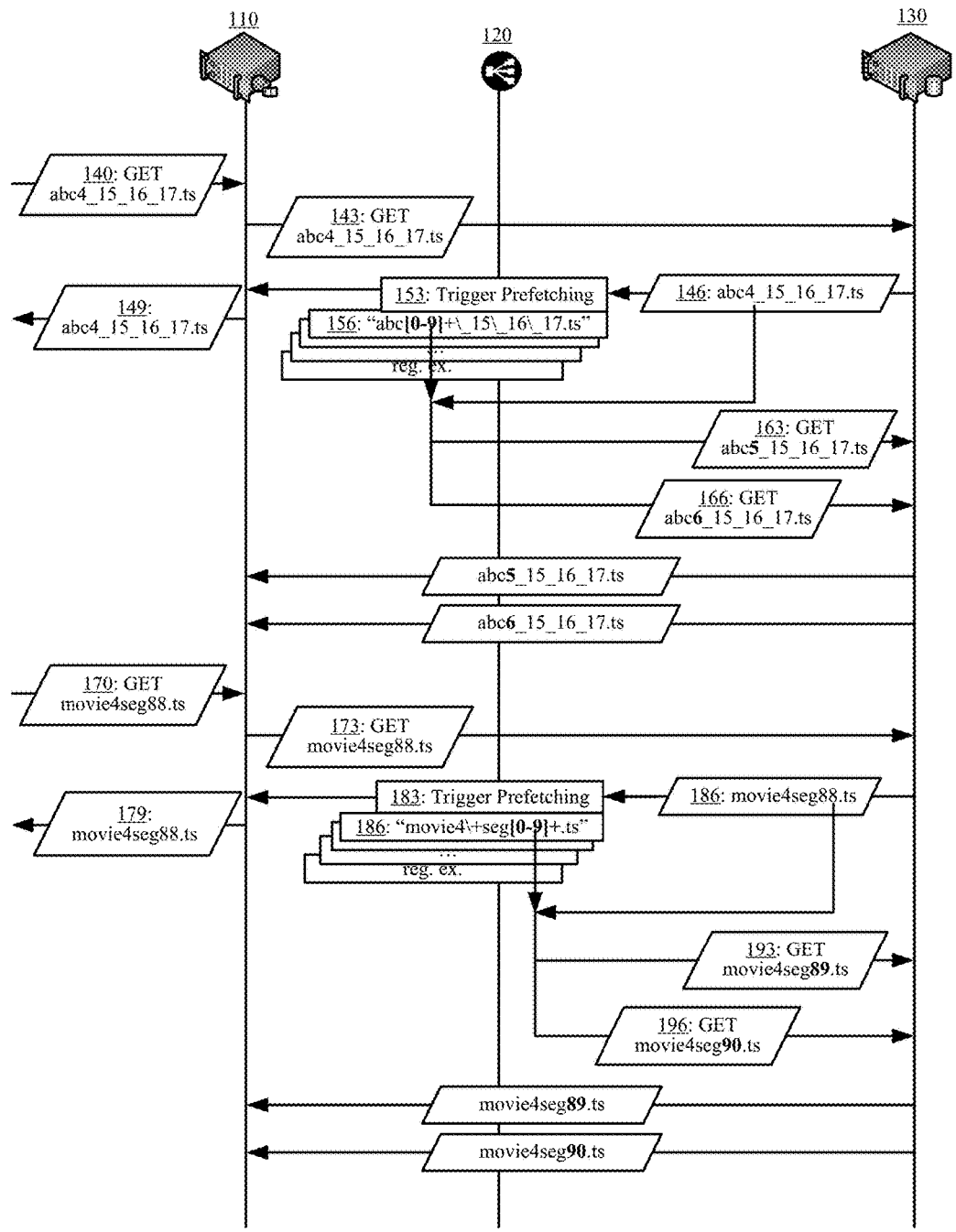
FIG. 1 conceptually illustrates prefetching segments of two streams that follow different naming conventions in accordance with some embodiments.

A dynamically adaptable stream segment prefetcher is provided to prefetch stream segments for different media streams that do not adhere to a common naming convention. The prefetcher adapts to prefetch segments for media streams with different segment name formats and with different placement of the segment name iterator within the differing formats.

The prefetcher generates prefetch requests in response to receiving a client issued request for a particular segment of a particular media stream. The prefetcher identifies the naming convention and variable portion of the particular media stream from the particular segment. The prefetcher then adapts the prefetch requests it generates for prefetching subsequent segments based on the identified naming convention and variable portion.

In some embodiments, the prefetcher identifies the naming convention and variable portion with regular expression matching. The prefetcher matches the segment name or Uniform Resource Locator (URL) from the client issued request to one of several defined regular expressions. The matching regular expression provides the naming convention format and location of the segment name iterator for the requested media stream. The prefetcher then generates the segment names for the prefetch requests according to the identified naming convention format and by identifying and incrementing the iterator specified in the client issued request.

In some embodiments, the regular expressions are part of the prefetcher configuration. Each regular expression defines the naming convention and variable portion for one or more media streams. The regular expressions can be provided by the media stream creators or a streaming server administrator. In some embodiments, the prefetcher automatically generates the regular expressions from at least two client issued requests for different segments of the same media stream.

The prefetcher executes in conjunction with a streaming server. The streaming server is a machine or device that delivers multiple streams over a digital network, such as the Internet. The segments for at least two different streams delivered by the streaming server have different naming conventions such that the location of the segment name iterator differs in the different streams and the segment name format differs as well. The two or more streams may originate from the same media stream creator or different media stream creators.

The stream segments delivered by the streaming server may be stored on one or more different origin servers. The streaming server accesses the origin servers to obtain client requested segments. The prefetcher similarly accesses the origin servers in order to prefetch segments in advance of client issued requests. The origin servers may be specialized storage devices, such as a Ceph storage cluster, that act as large repositories for retaining all segments of multiple streams. The origin servers fan out the media stream segments to different streaming servers for distribution across a larger set of client devices or end users. The prefetching eliminates the round-trip delay from the streaming server to the origin servers that would otherwise be incurred by the streaming server in responding to a client issued request for a segment that has not been prefetched from the origin server.

In some embodiments, the segments for the delivered streams may also or alternatively be stored to slower disk storage of the streaming server. In this scenario, the prefetching eliminates the delay associated with the reading from the slower disk storage that would otherwise be incurred by the streaming server in responding to a client issued request for a segment that has not been prefetched from the slower disk storage.

FIG. 1 conceptually illustrates prefetching segments of two streams that follow different naming conventions in accordance with some embodiments. In particular, the figure illustrates interactions for prefetching segments with different name formats between a streaming server 110, a prefetcher operating in conjunction with the streaming server 120, and an origin server 130 that is the repository for all segments of requested first and second streams.

The streaming server 110 receives (at 140) a first client issued request for segment "abc4_15_16_17.ts" of a first stream and receives (at 170) a second client issued request for segment "movie4+seg88.ts" of a second stream. The segment name formats are clearly different. The location of the segment name iterator is also different. However, it is not readily apparent which integer value in the different segment names is the iterator for requesting subsequent segments. The requests can be formatted as HyperText Transfer Protocol (HTTP) GET or POST messages or adhere to messaging formats of any streaming protocol such as HTTP Live Streaming (HLS), HTTP Dynamic Streaming (HDS), Dynamic Adaptive Streaming over HTTP (DASH), or Smooth Streaming as some examples.

The streaming server 110 forwards (at 143 and 173) the requests to the origin server 130. The origin server 130 responds (at 146 and 176) to the forwarded requests by returning the segment "abc4_15_16_17.ts" requested in the first request and the segment "movie4+seg88.ts" requested in the second request to the streaming server 110. The streaming server 110 can then respond (at 149 and 179) to the client issued requests with the correct segments.

The origin server 130 response triggers (at 153 and 183) the prefetching operations of the prefetcher 120. For instance, HyperText Transfer Protocol (HTTP) beacon headers may be used to trigger the prefetch operations of the prefetcher 120 based on the origin server 130 response. Instead of triggering the prefetching operations on the origin server response, the streaming server 110 can alternatively trigger the prefetching operations of the prefetcher 120 contemporaneous with the forwarding of the requests to the origin server 130 at steps 143 and 173.

Upon triggering the prefetch operations, the prefetcher 120 sets about identifying the naming convention formatting and location of the segment name iterator for each of the media streams requested with the first and second client issued requests. The prefetcher 120 uses regular expression matching to identify the different naming conventions of the first stream and the second stream.

From the regular expression matching, the prefetcher 120 identifies the location of the iterator for the segment names of the first stream and the second stream. In particular, the first matching regular expression 156 for the segment name of the first stream identifies that the first integer value in the segment name of the first request is the iterator, and the different second matching regular expression 186 for the segment of the second stream identifies that the second integer value in the segment name of the second request is the iterator. The prefetcher 120 uses the iterator location to extract the current requested segment iterator value from each of the first request and the second request. In this figure, the prefetcher 120 identifies that the first request is directed to segment "4" of the first stream and that the second request is directed to segment "88" of the second stream.

The prefetcher 120 then generates (at 163 and 166) requests with segment names "abc5_15_16_17.ts" and "abc6_15_16_17.ts" to prefetch the next two segments of the first stream (i.e., segments "5" and "6") from the origin server 130. The prefetcher 120 also generates (at 193 and 196) requests with segment names "movie4+seg89.ts" and "movie4+seg90.ts" to prefetch the next two segments of the second stream (i.e., segments "89" and "90") from the origin server 130. The prefetcher 120 sends the prefetch requests to the origin server 130 in advance of receiving any client issued requests for the segments being prefetched.

The origin server 130 responds to the prefetch requests by returning the corresponding segments directly to the streaming server 110 or indirectly to the streaming server 110 via the prefetcher 120. The streaming server 110 caches or temporarily buffers the segments for use in responding to subsequent requests from the clients originating the first and second requests as well as other clients that may request the prefetched segments.

Figure 2:
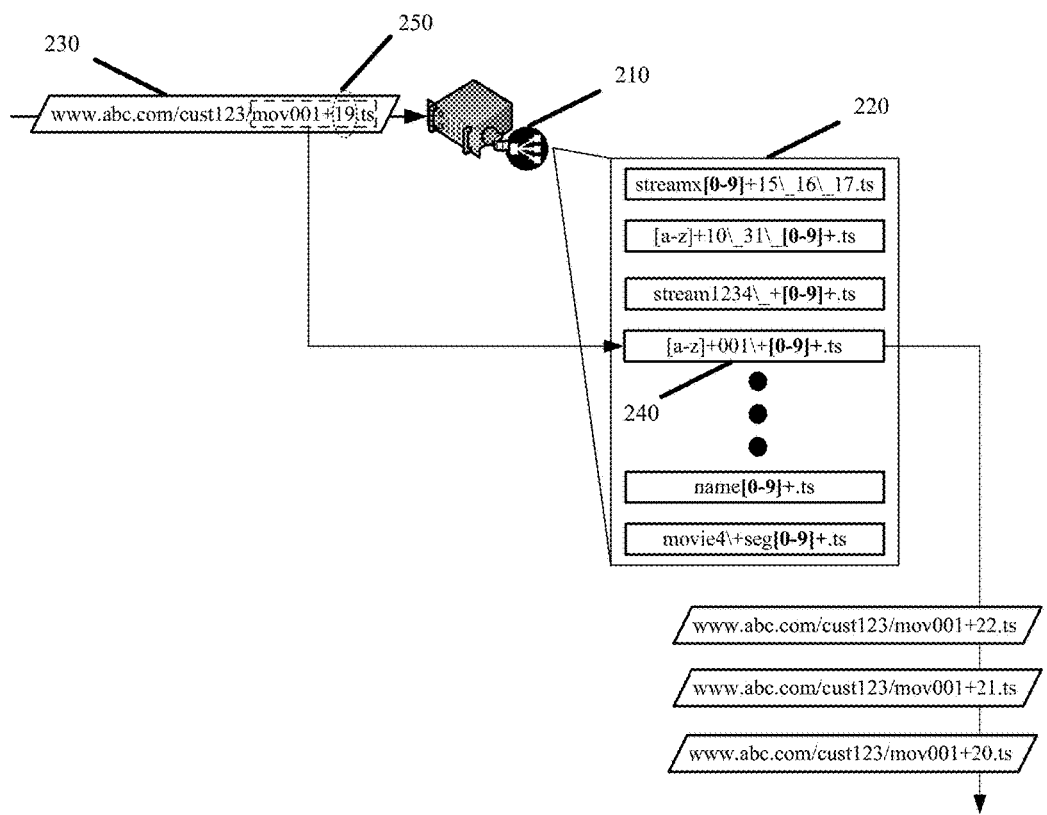
FIG. 2 conceptually illustrates the regular expression matching performed by the prefetcher in identifying the variable portion of the naming convention implicated by different client requests for different media streams in accordance with some embodiments.

FIG. 2 conceptually illustrates the regular expression matching performed by the prefetcher in identifying the variable portion of the naming convention implicated by different client requests for different media streams in accordance with some embodiments. The figure illustrates the prefetcher 210 configured with a set of regular expressions 220. The set of regular expressions 220 defines the naming conventions for the different media streams. The set of regular expressions 220 represents the different media streams to which the prefetcher can dynamically adapt and prefetch segments for. The set of regular expressions 220 may be stored to a common configuration or to different configurations for each prefetch supported media stream.

In response to receiving a segment request 230 from a client or retrieving the requested segment from an origin server, the prefetcher 210 extracts the segment name or URL from the client issued request 230. The prefetcher 210 matches the extracted segment name to a particular regular expression 240 from the set of regular expressions 220.

In some embodiments, the matching involves using the client issued request 230 URL to retrieve a configuration containing the particular regular expression 240 for the media stream at issue. The URL may be hashed with the hash result directing to the correct configuration with the particular regular expression 240 for the media stream at issue.

In some other embodiments, the matching involves comparing the extracted segment name with the set of regular expressions 220 in a common configuration in order to identify the matching particular regular expression 240. Since segments of different streams can appear to have the same format but still follow different name formats, some embodiments use a combination of the host or domain name from the URL and the segment name in order to conduct the regular expression matching. For example, a first stream served by the streaming server on behalf of domain "abc.com" may iterate over the first integer value in the segment name "abc1_8.ts" and a second stream served by the streaming server on behalf of "xyz.com" may iterate over the second integer value in the same segment name. Accordingly, a first regular expression "abc[0-9]+\_8.ts" can be matched to requests specifying the domain name "abc.com" and segment name "abc1_8.ts" combination while a different second regular expression "abc1\_[0-9]+.ts" can be matched to requests specifying the domain name "xyz.com" and segment name "abc1_8.ts" combination. In any case, the one or more configurations containing the regular expressions are very small in size and can be retained in the prefetcher 210 or streaming server memory to minimize the regular expression access and matching times.

The particular regular expression 240 specifies the naming convention that matches the naming convention formatting of the extracted segment name. The particular regular expression 240 also identifies the variable portion of the naming convention format. The prefetcher 210 extracts the value that is set at the variable portion of the extracted segment name 250.

The extracted value is used as the starting value for the iterator used in generating the prefetch requests. Specifically, the prefetcher 210 bases the iterator value on the extracted segment name to produce a first prefetch segment name. The prefetcher 210 generates a first prefetch segment request based on the first prefetch segment name and sends the first prefetch segment request to the origin server. The prefetcher 210 can continue incrementing the iterator value to produce a second prefetch segment name, a third prefetch segment name, etc. The number of times the prefetcher 210 increments the starting value extracted from the request 230 segment name is controlled by the number of segments to prefetch.

In some embodiments, the prefetcher 210 is configured to prefetch a different number of segments for different media streams. In some such embodiments, each regular expression in the set of expressions 220 is linked to a prefetch parameter, wherein the prefetch parameter specifies the number of segments to prefetch ahead of the segment requested by the client issued request 230. The prefetch parameter can be set by the stream creator or the streaming server administrator. Alternatively, the prefetcher can dynamically set the prefetch parameter based on load and demand.

Figure 3:
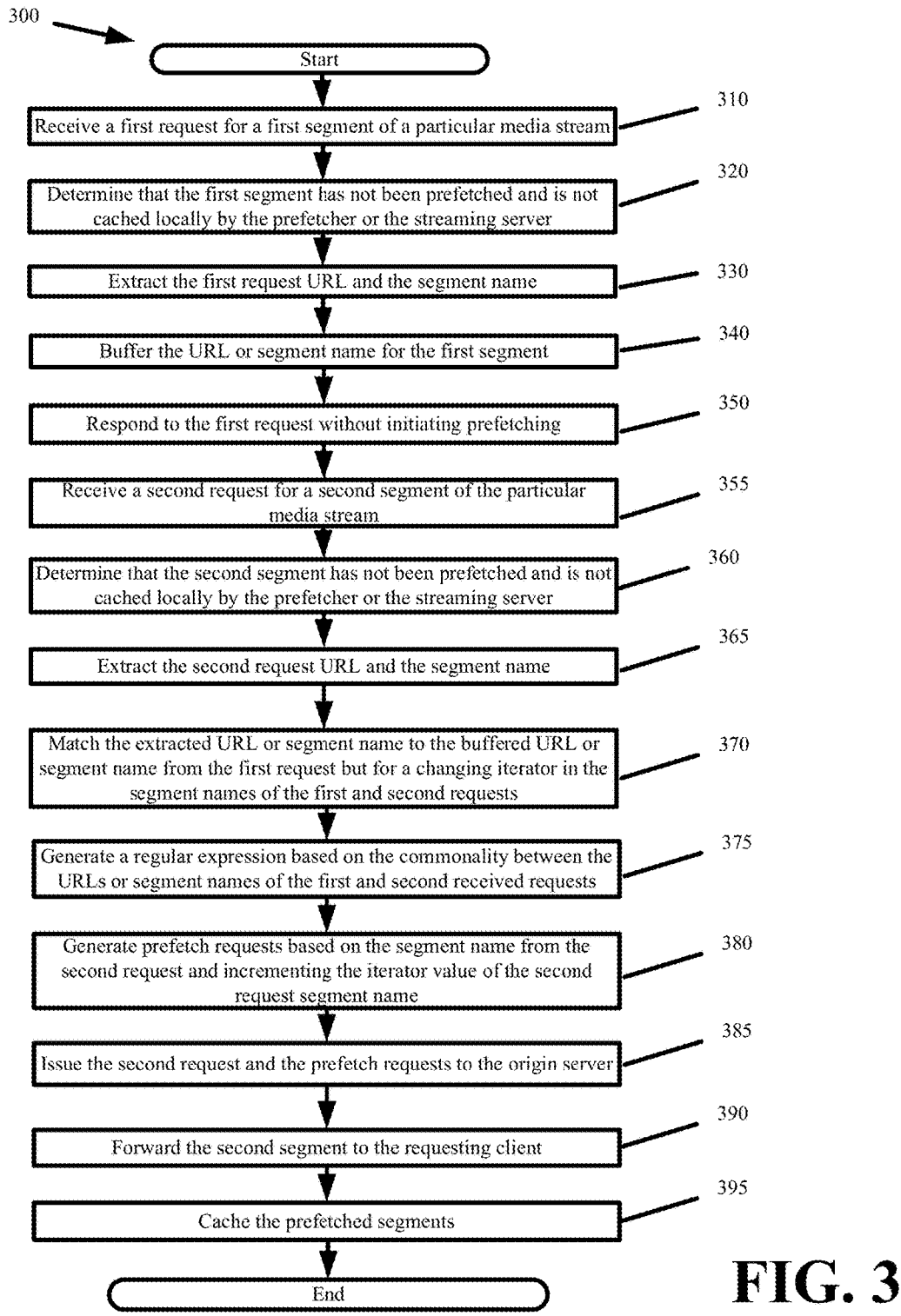
FIG. 3 presents a process for dynamically creating the regular expressions to facilitate prefetching of a media stream in accordance with some embodiments.

In some embodiments, the regular expressions are dynamically created by the prefetcher based on receipt of two or more client issued requests for different segments of the media stream. FIG. 3 presents a process 300 for dynamically creating the regular expressions to facilitate prefetching of a media stream in accordance with some embodiments. The process 300 is performed by the prefetcher running in conjunction with a streaming server in accordance with some embodiments.

The process 300 commences in response to receiving (at 310) a first client issued request. This first request includes a URL directing the request to a particular media stream and a first segment of the particular media stream. The process determines (at 315) that the first segment has not been prefetched and is not cached locally by the prefetcher or the streaming server.

The process extracts (at 320) the first request URL and the segment name from the first request URL. The process compares (at 330) the extracted URL or segment name to the defined set of regular expressions without identifying a matching regular expression. This may include hashing the first request URL and the hash result not linking to an existing regular expression configuration or unsuccessfully matching the extracted segment name to any regular expression of the set of regular expressions. The lack of a match may be due to the media stream creator not defining or providing the regular expression for the particular media stream to the streaming server or prefetcher. The lack of a match may also be due to the particular media stream being a new media stream that is requested for the first time from the streaming server.

In response to being unable to match the URL or segment name, the process buffers (at 340) the URL or segment name for the first segment. The process responds (at 350) to the first request by retrieving the first segment from an origin server and sending the first segment back to the requesting client without initiating prefetching.

The process continues in response to receiving (at 355) a second request for a second segment of the particular media stream from the client. The process determines (at 360) that the second segment has not been prefetched and is not cached locally by the prefetcher or the streaming server.

The process extracts (at 365) the second request URL and the segment name from the second request URL. Once again, the extracted URL or segment name does not match to a configured regular expression. The process compares (at 370) the extracted URL or segment name to the buffered URL or segment name from the first request and in this instance identifies a match but for a changing iterator in the segment names of the first and second requests. For example, the process determines that the segment names "abc4.ts" and "abc5.ts" match but for the changing iterator value.

The process generates (at 375) a regular expression to enter into the defined list of regular expressions based on the commonality between the URLs or segment names of the first and second received requests. The generated regular expression accounts for the variable portion of the changing iterator and also identifies the segment name formatting and variable portion of the particular media stream.

The process generates (at 380) one or more prefetch requests based on the segment name from the second request and incrementing the iterator value of the second request segment name. The process issues (at 385) the second request and the prefetch requests to the origin server, forwards (at 390) the second segment from the origin server back to the requesting client, and caches (at 395) the prefetched segments in order to optimize the streaming server response should the same or different client follow with requests for the prefetched segments.

Process 300 allows the prefetcher to adapt to and prefetch segments for media streams for which there is no previously configured regular expression with the prefetching commencing after a second received client request. The generated regular expression can be used to initiate prefetching for subsequent requests for segments of the particular media stream from the same client or requests for segments of the particular media stream from other clients.

There are several advantages to the prefetching embodiments described herein relative to other potential prefetching implementations. For instance, prefetching could be implemented by the streaming server retrieving a manifest listing all segments of a requested media stream, discovering the current requested segment and names for subsequent segments to prefetch from the full listing of the manifest, and using the discovered names to generate the prefetch requests. This implementation would require one round trip time to the origin server in order to retrieve the manifest. The provided embodiments implement prefetching without this round trip delay to the origin server. Moreover, the provided embodiments can obtain the regular expression identifying the variable portion of a media stream segment with a simple hash of the request URL or segment name, wherein other implementations involve comparing the segment name to the full listing of segment names in the manifest in order to identify the current segment, wherein the manifest can include thousands of segment names to scan through. Here again, the embodiments provide performance efficiencies that optimize the prefetching and the overall streaming server performance relative to other prefetching implementations.

The prefetching embodiments further allow the streaming server and prefetcher combination to serve and prefetch segments for streams that follow different naming conventions. Accordingly, different media stream creators can rely on the streaming server to distribute their streams without the media stream creators having to change or restrict the way in which they create the media streams.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 4:
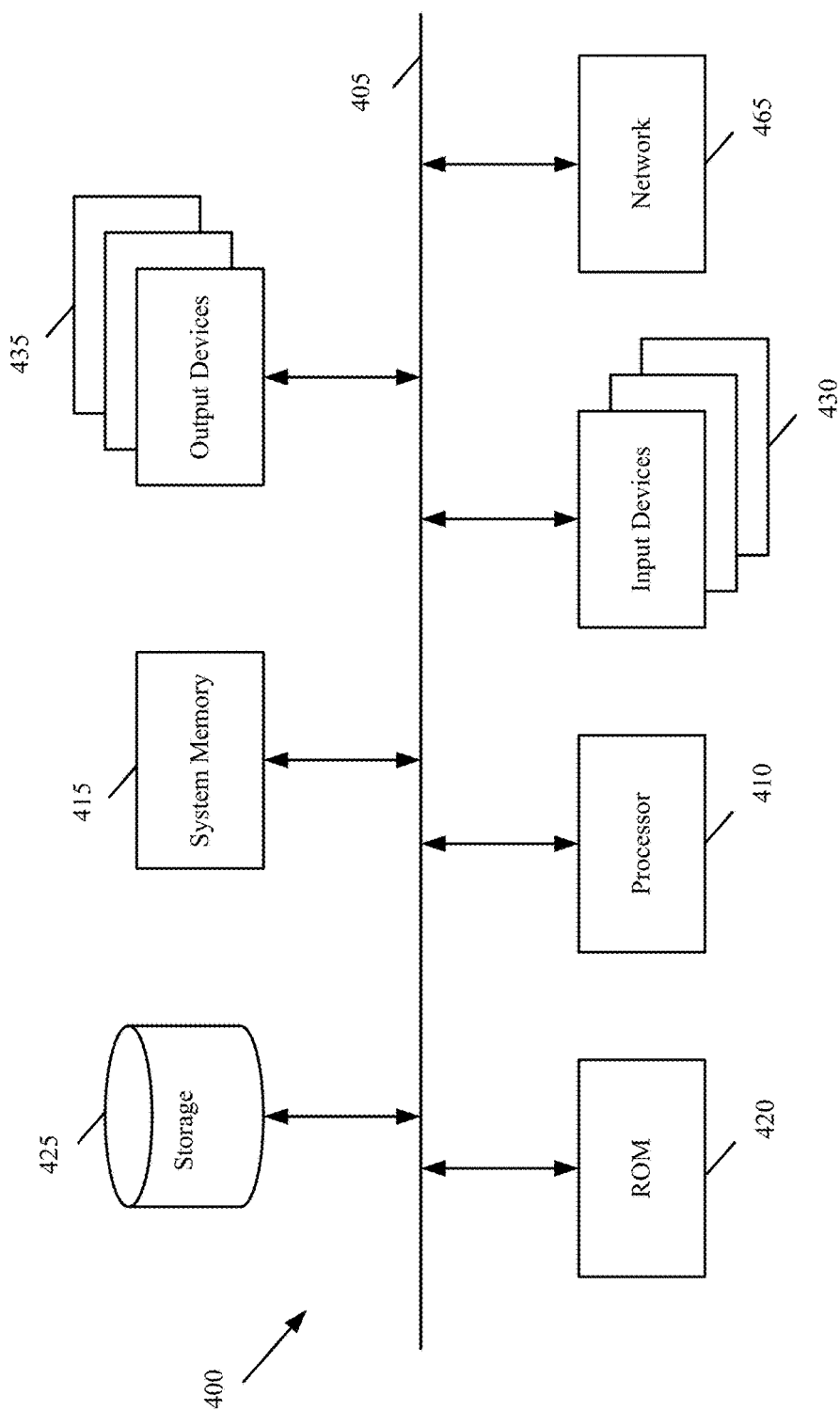
FIG. 4 illustrates a computer system or server with which some embodiments are implemented.

FIG. 4 illustrates a computer system or server with which some embodiments are implemented. Such a computer system includes various types of computer-readable mediums and interfaces for various other types of computer-readable mediums that implement the various methods and machines described above (e.g., request director, caching server, etc.). Computer system 400 includes a bus 405, a processor 410, a system memory 415, a read-only memory 420, a permanent storage device 425, input devices 430, and output devices 435.

The bus 405 collectively represents all system, peripheral, and chipset buses that communicatively connect the numerous internal devices of the computer system 400. For instance, the bus 405 communicatively connects the processor 410 with the read-only memory 420, the system memory 415, and the permanent storage device 425. From these various memory units, the processor 410 retrieves instructions to execute and data to process in order to execute the processes of the invention. The processor 410 is a processing device such as a central processing unit, integrated circuit, graphical processing unit, etc.

The read-only-memory (ROM) 420 stores static data and instructions that are needed by the processor 410 and other modules of the computer system. The permanent storage device 425, on the other hand, is a read-and-write memory device. This device is a non-volatile memory unit that stores instructions and data even when the computer system 400 is off. Some embodiments of the invention use a mass-storage device (such as a magnetic or optical disk and its corresponding disk drive) as the permanent storage device 425.

Other embodiments use a removable storage device (such as a flash drive) as the permanent storage device Like the permanent storage device 425, the system memory 415 is a read-and-write memory device. However, unlike storage device 425, the system memory is a volatile read-and-write memory, such as random access memory (RAM). The system memory stores some of the instructions and data that the processor needs at runtime. In some embodiments, the processes are stored in the system memory 415, the permanent storage device 425, and/or the read-only memory 420.

The bus 405 also connects to the input and output devices 430 and 435. The input devices enable the user to communicate information and select commands to the computer system. The input devices 430 include alphanumeric keypads (including physical keyboards and touchscreen keyboards), pointing devices. The input devices 430 also include audio input devices (e.g., microphones, MIDI musical instruments, etc.). The output devices 435 display images generated by the computer system. The output devices include printers and display devices, such as cathode ray tubes (CRT) or liquid crystal displays (LCD).

Finally, as shown in FIG. 4, bus 405 also couples computer 400 to a network 465 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 400 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A method comprising:
defining a plurality of regular expressions, each regular expression of the plurality of regular expressions comprising (i) a set of characters that matches a segment name format of a different particular media stream from a plurality of media streams, (ii) an iterator specifying a range that spans a plurality of values for requesting a plurality of segments of the particular media stream, and (iii) a set of symbols delineating a position of the iterator amongst the set of characters;

receiving a segment request directed to a first segment of a first media stream;

matching said segment request to a particular regular expression of the plurality of regular expressions based on part of a first Uniform Resource Locator (URL) from the segment request matching the first set of characters of the particular regular expression, and further based on a current value, at a position in the first URL corresponding to the position of the iterator in the particular regular expression, falling within the range specified by the iterator of the particular regular expression;

determining a next value that immediately follows the current value in the range specified by the iterator of the particular regular expression;

generating at least one prefetch request comprising a second URL with (i) the set of characters from the particular regular expression that are found in each segment of a plurality of segments of the first media stream and (ii) the next value positioned in the second URL amongst the set of characters in place of the iterator and the set of symbols of the particular regular expression, wherein the at least one prefetch request is directed to a second segment of the particular media stream, and wherein the second segment follows the first segment in the particular media stream; and prefetching the second segment with the at least one prefetch request in advance of receiving a request directed to the second segment.

2. The method of claim 1 further comprising extracting said current value from the first URL at the position of the iterator.

3. The method of claim 2, wherein said determining comprises incrementing said current value to the next value that is defined in the range.

4. The method of claim 2, wherein the first URL comprises a plurality of integer values separated by one or more other characters, and wherein the particular regular expression identifies a location of a particular integer value from the plurality of integer values as the location of the iterator.

5. The method of claim 1, wherein said matching comprises hashing the first URL of the segment request and obtaining the particular regular expression from the plurality of regular expressions based on a result of said hashing.

6. The method of claim 1, wherein said prefetching comprises sending the at least one prefetch request to a different origin server.

7. The method of claim 6 further comprising entering the at least one second segment in a cache and distributing the second segment from said cache without accessing the different origin server in response to receiving the request directed to the second segment at a time after said entering.

8. The method of claim 1, wherein the segment request is a first segment request, the method further comprising receiving a second segment request directed to a first segment of a second media stream that is different than the particular media stream.

9. The method of claim 8 further comprising matching the second segment request to a different second regular expression of the plurality of regular expressions, the second regular expression defining a different second set of characters for a different segment name format of the second media stream, and a different iterator than the particular regular expression matching to the first segment request.

10. The method of claim 9 further comprising generating a second prefetch request based on (i) the second set of characters from the second regular expression and (ii) an iterator value that is incremented from a value in the second segment request requesting the first segment of the second media stream, wherein the second prefetch request for the second media stream has a different name format and iterator position than the at least one prefetch request for the particular media stream.

11. A method comprising:

receiving a first request directed to a first segment of a particular media stream at a particular streaming server, the request comprising a Uniform Resource Locator (URL) specifying a name of the first segment;

identifying at the particular streaming server, a first segment identifier in the name of the first segment by matching the name of the first segment to a search pattern of a regular expression defined for the particular media stream, and by determining a position within the name that corresponds to a position of an iterator defined as part of the regular expression, wherein the iterator specifies a range that spans a plurality of values for requesting a plurality of segments of the particular media;

extracting a current value from said position in the name of the first segment corresponding to the position of the iterator defined as part of the regular expression, wherein the current value falls in the range of the iterator;

generating at the particular streaming server, a second request to prefetch a second segment of the particular media stream following the first segment, said generating comprising incrementing the current value and producing a name of the second segment from the segment naming convention defined by the regular expression and from inserting the incremented current value in the name of the second segment at the position of the iterator;

prefetching the second segment by passing the second request from the particular streaming server to a different origin server in advance of the particular streaming server receiving a client issued request directed to the second segment.

12. The method of claim 11 further comprising receiving a third request directed to a first segment of a different second media stream and buffering a first name of the first segment of the second media stream in response to the first name not matching to a defined regular expression.

13. The method of claim 12 further comprising receiving a fourth request directed to a second segment of the second media stream and detecting an iterator position in a segment naming convention of the second media stream based on a comparison of a second name of the second segment and the first name of the first segment.

14. The method of claim 13 further comprising generating a fifth request to prefetch a third segment of the second media stream following the second segment, said generating comprising incrementing a current value of an iterator from said iterator position in the second name of the second segment of the second media stream and producing a third name for requesting the third segment of the second media stream from incrementing the current value of the iterator in the second name of the second segment.

15. The method of claim 14 further comprising prefetching the third segment of the second media stream by passing the fifth request to an origin server storing the second media stream in advance of receiving a client issued request directed to the third segment of the second media stream.

16. The method of claim 11 further comprising receiving at the particular streaming server, a plurality of regular expressions from a plurality of media stream creators, each regular expression of the plurality of regular expressions defining a different segment naming convention for one or more media streams created by a media stream creator.

17. The method of claim 16 further comprising selecting said regular expression from the plurality of regular expressions using the URL of the first request.

18. The method of claim 16 further comprising selecting said regular expression by comparing the name of the first segment against the plurality of regular expressions and matching said name of the first segment to said regular expression.

19. A segment prefetching method performed by a particular streaming server distributing a plurality of different media streams to a plurality of requesting clients, the method comprising:
- receiving a first request directed to a segment of a first media stream and a second request directed to a segment of a different second media stream;
- detecting in response to the first request, a first name format comprising a first set of static characters that are repeated in names of segments from the first media stream;
- identifying a first iterator position in the first name format, the first iterator position corresponding to one or more characters amongst the first set of static characters that change for each segment of the first media stream;
- detecting in response to the second request, a second name format comprising a second set of static characters that are repeated in names of segments from the second media stream;
- identifying a second iterator position in the second name format, wherein the second name format is different than the first name format and wherein the second iterator position is a first number of characters from a first character of the second set of static characters and the first iterator position is a different second number of characters from a first character of the first set of static characters;
- prefetching a first set of next segments from the first media stream using a first set of prefetch requests, each prefetch request of the first set of prefetch requests comprising the first set of static characters defined according to the first name format and a different incrementing first value at the first iterator position amongst the first set of static characters, wherein the incrementing first value is greater than a value at the first iterator position in a segment name specified in the first request, wherein said first set of next segments from the first media stream follow the segment of the first media stream specified in the first request; and
- prefetching a second set of next segments from the second media stream using a second set of prefetch requests, each prefetch request of the second set of prefetch requests comprising the second set of static characters defined according to the second name format and a different incrementing second value at the second iterator position amongst the second set of static characters, wherein the incrementing second value is greater than a value at the second iterator position in a segment name specified in the second request, wherein said second set of next segments from the second media stream follow the segment of the second media stream specified in the second request.

20. The method of claim 19, wherein detecting the first name format comprises matching the first request to a first regular expression defining the first name format of the first media stream, and wherein detecting the second name format comprises matching the second request to a different second regular expression defining the second name format of the second media stream.

* * * * *